Patented May 29, 1951

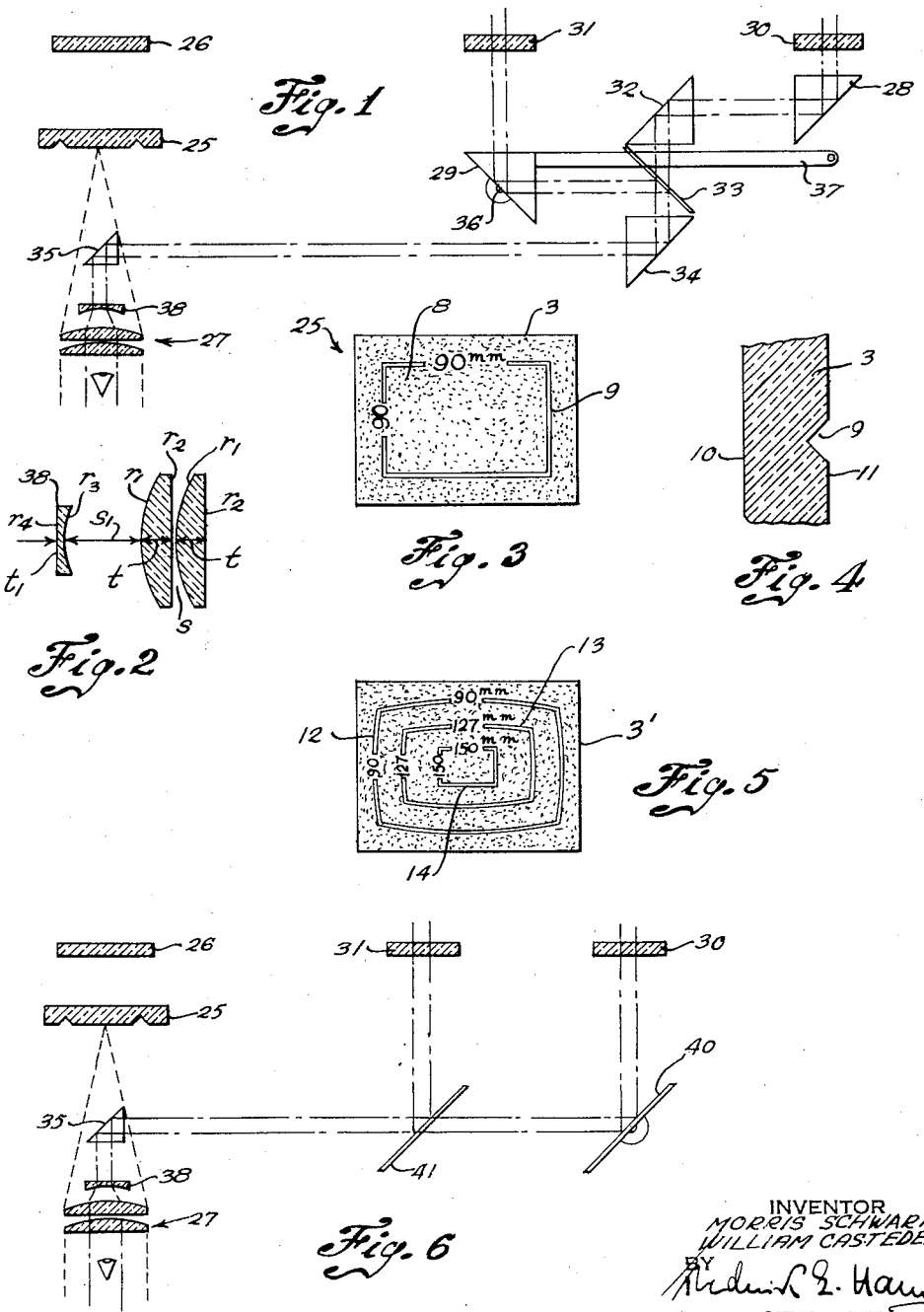

2,554,798

UNITED STATES PATENT OFFICE 2,554,798

RANGE FINDER-VIEW FINDER UNIT

Morris Schwartz and William Castedello, Stamford, Conn., assignors to The Kalart Company Inc., Stamford, Conn.

Original application January 22, 1947, Serial No. 723,521. Divided and this application May 28, 1948, Serial No. 29,744

3 Claims. (Cl. 88—2.7)

This invention relates to range finders and view finders for use in connection with photographic apparatus, particularly cameras.

Range finders of the general type, above referred to, are conventionally used to measure the range between the photographic apparatus and an exterior object. They may be either of the superimposed image type, in which two images of the object are superimposed to ascertain the range to be measured or of the split image type in which the two images are placed in a predetermined position relative to each other, usually in an end to end position. Conventional photographic range finders, either of the superimposed image type or of the split image type, are designed as self contained units or coupled with the lens of the photographic apparatus for direct focusing of the lens.

View finders of the general type, above referred to, are conventionally used to frame the image of an object at which the photographic apparatus associated with the view finder is aimed, for the purpose of indicating to the operator the limits of the image that will be projected by the lens of the photographic apparatus upon a sensitized plate or film placed in the photographic apparatus. This invention relates particularly to view finders of the type known as collimating view finders.

One of the objects of the invention is to provide a combined range finder-view finder unit or combination.

Another object of the invention is to provide a range finder-view finder unit which permits the use of a single and common eyepiece or viewing window to perform both the range finding and the view finding operation.

Another more specific object of the invention, allied with the preceding one, is to provide a range finder-view finder unit in which certain of the optical components are common to both finders thereby making the unit more compact and simplifying the design thereof.

Still another object of the invention is to provide a range finder-view finder unit which permits to perform both, the range finding and the view finding operation without requiring the operator to shift appreciably the positions of his eyes on the position in which the photographic apparatus is held during the operations. For range finding, the operator places one eye close to the eyepiece while keeping the other eye closed and for view finding he opens the second eye also while keeping the other eye in its position close to the eyepiece.

Other and further objects, features and advantages of the invention will be hereinafter set forth and the novel features thereof defined by the appended claims forming part of the application.

The present application is a divisional application based upon our co-pending application Ser. No. 723,521 filed January 22, 1947 issued as Patent 2,487,773 on November 8, 1949.

In the accompanying drawings several now preferred embodiments of the invention are shown by way of illustration and not by way of limitation.

In the drawings:

Fig. 1 shows diagrammatically a combined range finder and view finder according to the invention.

Fig. 2 shows the lens system of the range finder-view finder combination on an enlarged scale.

Fig. 3 is a plan view of a framing mask as may be used in the view finder of the finder unit according to Fig. 1.

Fig. 4 is a fragmentary sectional view of a mask according to the Fig. 3 on an enlarged scale.

Fig. 5 is a modification of a framing mask, and

Fig. 6 is a modification of a range finder-view finder unit according to the invention.

Referring now to the figures in detail, Fig. 1 shows a combination of a collimating view finder and of a super-imposed image range finder. The component parts of both finders may be mounted in a common housing or in a suitable compartment of a camera casing. As the mounting of the component parts is not essential for the understanding of the invention, it need not be described or shown here in detail.

The view finder comprises a mask, generally designated by 25, a window 26 for illuminating the view finder mask, and an eyepiece, generally designated by 27.

The range finder comprises two reflectors 28 and 29 respectively shown as prisms which receive light from an exterior object the range of which is to be determined through windows 30 and 31 respectively. Prism 28 reflects the entering light to a mirror or prism 32 which in turn reflects the light through a beam splitter 33 consisting for instance of a semi-transparent mirror, to a mirror or a prism 34. Prism 29 reflects the entering light to beam splitter 33 which in turn reflects light to a mirror or prism 34. The two light beams entering through windows 30 and 31 are reflected by prism 34 to a small mirror or prism 35 mounted in the optical path between window 26 and eyepiece 27. As a result, two images of the object are viewable through the eyepiece.

One of the prisms 28 and 29 is mounted pivotally to adjust the relative position of the two images as viewable through eyepiece 27. In the embodiment shown, prism 29 is pivotal about a pivot 36 connected to a lever 37 which in turn may be coupled with the objective carrier of a camera. Various designs of lens-coupled range finders are known in the art so that they need not be described here in detail. As is well known, lens-coupled range finders are generally so arranged that the lens is correctly focused when the two images, as viewable through eyepiece 27, appear to the eye of an observer in a superimposed position or in an end to end position in case of split-image type range finders. As will be more fully explained hereinafter, the lens system of the eyepiece should have short focus wide field characteristics to satisfy the requirements of view finding. As a result, light from the range finder, if permitted to enter the eyepiece directly, would result in a strongly converging beam which the eye can not focus into an image. To overcome this difficulty, a negative lens 38 is inserted in the optical path between lens 35 and eyepiece 27. This negative lens causes a divergence of the range finder beams which the eyepiece lenses refract collectively, resulting in parallel beams. By varying the power and spacing of the negative lens the magnification of the inverted Galilean telescope formed by the combination of the negative lens 38 and the eyepiece 27 can be varied from any small value to unity. In practice, a magnification of 0.8 power has been found to be particularly advantageous.

Eyepiece 27, diagrammatically shown on Fig. 1, comprises a wide angle lens focused upon mask 25. As will be apparent, the distance between eyepiece and mask has to be quite short in practice, to fit the view finder into the space normally available for both, view finders designated as an attachment and view finders built into the camera casing proper. On the other hand, the mask plate and the enclosed area thereon should be as large as possible to attain a satisfactory viewing effect. As a result, the angle of the lens must be exceedingly wide, in practice an angle between 70 to 80° has been found necessary.

Fig. 2 shows a suitable inverted Galilean system including an eyepiece with wide angle lens system which has the following optical constants:

All glass $n_d = 1.523$; $v = 58.8$
$r_1 = 1.26''$
$r_2 = \infty$
$s = 0.02''$
$t = 0.156''$
$s_1 = 0.62''$
$r_3 = 0.525''$
$r_4 = \infty$
$t_1 = 0.075''$ An eyepiece according to Fig. 2 covers an angle of 70 to 80°. It shows little astigmatism and only moderate amounts of coma and lateral chromatic aberration.

Figs. 3 and 4 show mask 25 in detail. The mask is shown as a plate 3 made of any suitable material such as glass or a transparent plastic. The mask is provided with a framed area 8 marked by lines 9. The framed area 8 can be marked either by light lines on dark ground or by dark lines on light ground. Tests have shown that an enclosed area marked by light markings on dark ground is preferable to a framed area marked by dark markings on light ground. The dark and light areas of the mask may be black and white or differently shaded, for example differently colored.

To attain the desired contrast in the markings, the framed lines are preferably clear or fully transparent lines while the remainder of the mask surface, both inside and outside of the framed area 8, is ground or frosted so that a certain translucency of the mask is retained.

The frame lines can be marked by etching, cutting, photographing, printing, or any other suitable process. It is also possible to thin the mask plate along the intended frame lines.

Practical tests have shown that the illumination of the lines circumscribing the framed area 8 is of great importance for the efficiency of the view finder. A high light gathering power of the mask lines is particularly essential to the use of a wide field eyepiece as it is desirable for modern cameras to embrace wide angles of view.

A mask plate design as shown on Fig. 4, has been found to be particularly advantageous. The mask plate 3 is made of glass or transparent plastic and is provided on its side facing the object to be viewed with a glossy or ground or opal surface 10. The opposite side facing eyepiece 27 is coated with an opaque coat 11 or otherwise made opaque. In this opaque surface, the frame lines 9 are engraved so as to form a trough or groove, preferably having a V-shaped cross-section. Extensive tests have shown that the angular sides of frame lines 9 help to gather light from the ground surface which in turn is illuminated by light coming from the object being viewed. As a result, the frame lines appear to be strongly illuminated even if the exterior light is comparatively weak.

A certain distortion is inherent in short-focus wide field eyepieces. As a result of such distortion, the framed area superimposed into the field of normal vision may appear somewhat distorted to an observer. Fig. 5 shows a mask arrangement which compensates for the inherent distortion of the eyepiece. According to Fig. 5, a mask plate 3' includes several framed areas which are circumscribed by deformed or bowed lines. Three enclosed areas circumscribed by lines or rather grooves 12, 13 and 14 are shown. The distortion of the frame lines increases with increased enclosed area, the smallest frame being shown as having straight lines. The distortion of each enclosed area is selected so as to have the same amount and kind of distortion as the lens system for the respective enclosed area.

The purpose and advantage of providing a plurality of masking areas are that the fields of view of a plurality of camera lenses of different focal lengths can be covered by the same view finder. Mask 12 may be intended for a wide angle camera lens, mask 13 for a normal lens, and mask 14 for a telephoto lens, as indicated by the distances marked on the mask. It will of course be understood that the mask according to Fig. 3 can also be provided with a plurality of masking areas, and vice versa only one masking area circumscribed by curved lines or grooves may be employed.

The structural design of the mask plate according to Fig. 5 is preferable the same as has been described in connection with Fig. 4.

In Fig. 1, the optical paths of light beams from the range finder windows 30 and 31 are indicated by dashed-dotted lines, and the optical path of the light rays from the mask 25 are indicated by dotted lines. As will be observed all light rays passing through the eyepiece are parallel.

An observer who intends to operate the finder combination, as shown in Fig. 1 for range finding simply places his one eye closely to eyepiece 27 while he closes his second eye. Then, by manipulating the objective carrier he can bring the two images as viewable through the eyepiece, into a superimposed position indicative of the correct focusing of the camera lens. When the operator now opens his second eye while continuing to look with the other eye through eyepiece 27, he will see the enclosed area of the mask visually superimposed into the field of normal vision so that the operator can aim the camera correctly. Prism 35 and lens 38 must of course be made so small that they will not appreciably interfere with the viewfinding operation.

Fig. 6 shows a modification of the range finder-view finder unit according to Fig. 1. The optical system of the view finder of Fig. 6 and the optical components associated with the view finder are the same as shown in Fig. 1 while the optical system of the range finder is somewhat simplified.

According to Fig. 6, the range finder comprises a solidly silvered mirror 40 pivotally mounted and coupled with the lens of a camera by conventionally coupling means known in the art for such purposes, and a stationary semitransparent mirror or beamsplitter 41. Mirrors 40 and 41 are mounted in optical alignment with prism 35. As a result, two images of an exterior object are viewable through eyepiece 27 as has been fully explained in connection with Fig. 1. The optical paths of light beams from the range finder windows 30 and 31 are again indicated by dashed-dotted lines. By varying the pivotal position of mirror 40, the two images can be placed in a superimposed position.

While the invention has been described in detail with respect to certain now preferred examples and embodiments of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A combined collimating view finder and range finder for photographic purposes having a single common viewing opening comprising a mask, and a wide angle, short focal length eyepiece having a substantially flat field focused upon the mask, said mask comprising a plane plate including a framed area, a pair of first and second range finder reflecting means, means for varying the angular position of said range finder reflecting means relative to each other, a pair of light beam entrance windows for said range finder reflecting means, third range finder reflecting means positioned between the eyepiece and said mask in optical alignment therewith and occupying a comparatively small fraction of the total area of said mask, fourth range finder reflecting means including a pair of light reflecting means and a semi-transparent mirror mounted between said pair of light reflecting means, one reflecting means of the said pair being in an optical relationship with the first range finder reflecting means for causing the said light reflecting means to reflect one image to the second light reflecting means of the said pair through the semi-transparent mirror, said mirror being in an optical relationship with the second range finder reflecting means so as to reflect the second image to the second light reflecting means, the said second light reflecting means being positioned to reflect the said two images to the third range finder reflecting means, said third range finder reflecting means reflecting the two images to the eyepiece, and a negative lens between said third range finder reflecting means and said eyepiece occupying an area substantially equal to the area occupied by the third range finder reflecting means and forming together with the eyepiece an inverted Galilean system having a magnification power of at least unity.

2. A combined collimating view finder and range finder for photographic purposes having a single common viewing opening comprising a mask, and a wide angle, short focal length eyepiece having a substantially flat field focused upon the mask, said mask comprising a plane plate made of transparent material and having a substantially opaque surface on the side facing the eye piece, said opaque surface including a framed area defined by grooves extending into the transparent plate material, a pair of first and second range finder reflecting means, means for varying the angular position of said range finder reflecting means relative to each other, a pair of light beam entrance windows for said range finder reflecting means, third range finder reflecting means positioned between the eyepiece and said mask in optical alignment therewith and occupying a comparatively small fraction of the total area of said mask, fourth range finder reflecting means including a pair of light reflecting means and a semi-transparent mirror mounted between said pair of light reflecting means, one light reflecting means of the said pair being in an optical relationship with the first range finder reflecting means for causing the said light reflecting means to reflect one image to the second light reflecting means of the said pair through the semi-transparent mirror, said mirror being in an optical relationship with the second range finder reflecting means so as to reflect the second image to the second light reflecting means, the said second light reflecting means being positioned to reflect the said two images to the third range finder reflecting means, said third range finder reflecting means reflecting the two images to the eyepiece, and a negative lens between said third range finder reflecting means and said eyepiece occupying an area substantially equal to the area occupied by the third range finder reflecting means and forming together with the eyepiece an inverted Galilean system having a magnification power of at least unity.

3. A combined collimating view finder and range finder for photographic purposes having a single common viewing opening comprising a mask, and a wide angle, short focal length eyepiece having a substantially flat field focused upon the mask, said mask comprising a plane plate made of transparent material and having a substantially opaque surface on the side facing the eyepiece, said opaque surface including a framed area defined by substantially V-shaped grooves extending into the transparent plate material, the angular walls of said grooves having light collecting properties, a pair of first and second range finder reflecting means, means for varying the angular position of said range finder reflecting means relative to each other, a pair of light beam entrance windows for said range finder reflecting means, third range finder reflecting means positioned between the eyepiece and said mask in optical alignment therewith and occupying a comparatively small fraction of the total area of said mask, fourth range finder reflecting means including a pair of light reflecting means and a semi-transparent mirror mounted between said pair of light reflecting means, one reflecting means of the said pair being in an optical relationship with the first range finder reflecting means for causing the said light reflecting means to reflect one image to the second light reflecting means of the said pair through the semi-transparent mirror, said mirror being in an optical relationship with the second range finder reflecting means so as to reflect a second image to the second light reflecting means, the said second light reflecting means being positioned to reflect the said two images to third range finder reflecting means, said third range finder reflecting means reflecting the two images to the eyepiece, and a negative lens disposed between said third range finder reflecting means and said eyepiece and occupying an area substantially equal to the area occupied by the third range finder reflecting means, said lens forming together with the eyepiece an inverted Galilean system having a magnification power of at least unity.

MORRIS SCHWARTZ.
WILLIAM CASTEDELLO.

REFERENCES CITED

The following references are of record in the file of this patent:

UNITED STATES PATENTS

| Number | Name | Date |
|---|---|---|
| 1,616,723 | Wandersleb | Feb. 8, 1927 |
| 2,384,552 | Kaprelian | Sept. 11, 1945 |
| 2,386,614 | Kaprelian | Oct. 6, 1945 |

FOREIGN PATENTS

| Number | Country | Date |
|---|---|---|
| 601,694 | Germany | Aug. 22, 1934 |
| 485,863 | Great Britain | May 25, 1938 |
| 846,959 | France | June 19, 1939 |
| 876,699 | France | Aug. 17, 1942 |